United States Patent
Küchler et al.

(10) Patent No.: US 12,241,990 B2
(45) Date of Patent: Mar. 4, 2025

(54) METHOD, DEVICE AND SYSTEM FOR VERIFYING UWB RANGING RESULTS

(71) Applicant: NXP B.V., Eindhoven (NL)

(72) Inventors: Wolfgang Küchler, Graz (AT); Jacek Tyminski, Lassnitzhoehe (AT)

(73) Assignee: NXP B.V., Eindhoven (NL)

( * ) Notice: Subject to any disclaimer, the term of this patent is extended or adjusted under 35 U.S.C. 154(b) by 383 days.

(21) Appl. No.: 17/822,607

(22) Filed: Aug. 26, 2022

(65) Prior Publication Data

US 2023/0099294 A1 Mar. 30, 2023

(30) Foreign Application Priority Data

Sep. 30, 2021 (EP) ..................... 21200230

(51) Int. Cl.
G01S 5/14 (2006.01)
G01S 5/02 (2010.01)
H04W 64/00 (2009.01)

(52) U.S. Cl.
CPC ............. G01S 5/14 (2013.01); G01S 5/021 (2013.01); H04W 64/00 (2013.01)

(58) Field of Classification Search
None
See application file for complete search history.

(56) References Cited

U.S. PATENT DOCUMENTS

| | | |
|---|---|---|
| 11,184,153 B2 | 11/2021 | Hammerschmidt et al. |
| 2019/0013937 A1 | 1/2019 | Leong et al. |
| 2019/0222443 A1 | 7/2019 | Baier et al. |
| 2020/0287959 A1* | 9/2020 | Li .................. H04W 48/16 |
| 2020/0359275 A1* | 11/2020 | Li .................. H04W 74/002 |
| 2021/0014677 A1 | 1/2021 | Han et al. |
| 2022/0239532 A1 | 7/2022 | Niewczas et al. |

FOREIGN PATENT DOCUMENTS

| | | | | |
|---|---|---|---|---|
| EP | 4080244 A1 * | 10/2022 | ............. | G01S 11/08 |
| KR | 20230010748 A * | 1/2023 | | |
| WO | WO-2021261797 A1 * | 12/2021 | | |

OTHER PUBLICATIONS

IEEE Std 802.15.4z™, "IEEE Standard for Low-Rate Wireless Networks Amendment 1: Enhanced Ultra Wideband (UWB) Physical Layers (PHYs) and Associated Ranging Techniques", IEEE Computer Society, Nov. 2020.
Capkun, S., "Secure positioning of wireless devices with application to sensor networks", Proceedings IEEE 24th Annual Joint Conference of the IEEE Computer and Communications Societies, Mar. 13-17, 2005.
Domuta, I., "Two-ay Ranging Algorithn1s for Clock Error Compensation", IEEE Transaction on Vehicular Technology. vol. 70, No. 8, Aug. 2021.

* cited by examiner

*Primary Examiner* — Kevin Kim

(57) ABSTRACT

There is described a method of verifying a time-of-flight based ranging result in a UWB ranging device, the method comprising: exchanging a sequence of messages between the UWB ranging device and a further UWB ranging device as part of a double-sided ranging process to obtain round times and response times at both the UWB ranging device and the further UWB ranging device; estimating a time-of-flight value based on the round times and response times; and verifying the ranging result by performing a consistency check based on the estimated time-of-flight value and one or more predetermined parameter values. Furthermore, a UWB ranging device and a UWB ranging system are described.

20 Claims, 5 Drawing Sheets

METHOD, DEVICE AND SYSTEM FOR VERIFYING UWB RANGING RESULTS

CROSS-REFERENCE TO RELATED APPLICATIONS

This application claims the priority under 35 U.S.C. § 119 of European Patent application no. 21200230.7, filed on 30 Sep. 2021, the contents of which are incorporated by reference herein.

TECHNICAL FIELD

The present disclosure relates to the field of UWB (ultra-wideband) based ranging techniques. More specifically, the present disclosure relates to a method of verifying a time-of-flight based ranging result in a UWB ranging device. The present disclosure further relates to a UWB ranging device capable of performing the aforementioned method as well as a UWB ranging system comprising at least two UWB ranging devices.

ART BACKGROUND

Current state of the art UWB Secure Ranging solutions are susceptible to a manipulation of the XTAL reference frequency. It can be shown that a frequency manipulation of only 0.005% of the nominal XTAL frequency between the ranging frames can lead to a ranging error of 150 m. An external XTAL is used, because high frequency precision is needed for the RF operation, as well as the Time-of-Flight measurement. The required precision cannot be achieved with a purely internal oscillator with state-of-the-art semiconductor technology. It is hence also very difficult to detect small frequency manipulations on the IC.

An attacker may also try to manipulate the ranging timer or the precise time measurements via supply glitch, clock glitch or EMC attacks.

There may thus be a need for ways of verifying the obtained ranging results in order to detect such attacks.

SUMMARY

This need may be met by the subject matter according to the independent claims. Advantageous embodiments of the present disclosure are set forth in the dependent claims.

According to a first aspect, there is provided a method of verifying a time-of-flight based ranging result in a UWB ranging device, the method comprising: exchanging a sequence of messages between the UWB ranging device and a further UWB ranging device as part of a double-sided ranging process to obtain round times and response times at both the UWB ranging device and the further UWB ranging device, estimating a time-of-flight value based on the round times and response times, and verifying the ranging result by performing a consistency check based on the estimated time-of-flight value and one or more predetermined parameter values.

This aspect is based on the idea that a consistency check is performed to verify the ranging result, i.e., to verify that the estimated distance between the UWB ranging device and the further UWB ranging device is consistent. The consistency check is based on the estimated time-of-flight value (which is used to calculate the distance between the ranging devices) and at least one predetermined parameter value which, e.g., represents general conditions, constraints, estimated values, and/or other information that is useful to determine whether the ranging result is reliable.

According to an embodiment, the consistency check comprises a first consistency check, said first consistency check comprising: checking that the estimated time-of-flight value is between zero and a predetermined maximum time-of-flight value.

In other words, the first consistency check serves to verify that the estimated time-of-flight makes physical sense by, on the one hand, not being negative and, on the other hand, not exceeding a predetermined maximum value. This check is very simple to carry out and can efficiently detect severe manipulations of the device frequency. A typical value for the predetermined maximum time-of-flight value may be 100 ns (corresponding to ~30 m distance).

According to a further embodiment, the method further comprises: estimating a relative frequency factor based on the round times and response times, the relative frequency factor being indicative of a ratio between the frequencies of the UWB ranging device and the further UWB ranging device, wherein the consistency check is further based on the estimated relative frequency factor.

The relative frequency factor provides valuable information on the ratio between the actual frequencies of the UWB ranging devices, which can be used to verify the ranging result in numerous ways.

Assuming that there is no frequency manipulation in either of the ranging devices, the relative frequency factor $f_r$ can easily be calculated from the round times and response times: $f_r = (T_{md1} + T_{rsp2})/(T_{rsp1} + T_{md2})$, where $T_{md1}$ is the round time at the UWB ranging device, $T_{rsp2}$ is the response time at the UWB ranging device, $T_{rsp1}$ the response time at the further UWB ranging device, and $T_{md2}$ is the round time at the further UWB ranging device.

According to a further embodiment, the consistency check comprises a second consistency check, said second consistency check comprising: calculating a first single-sided time-of-flight value based on the round time of the UWB ranging device, the response time of the further UWB ranging device, and the relative frequency factor; calculating a second single-sided time-of-flight value based on the round time of the further UWB ranging device, the response time of the UWB ranging device, and the relative frequency factor, and checking that both the calculated first single-sided time-of-flight value and the calculated second single-sided time-of-flight value are within a predetermined range around the estimated time-of-flight value.

In other words, utilizing the relative frequency factor, two single-sided time-of-flight ranging cycles are extracted from the double-sided ranging cycle and two corresponding time-of-flight values are calculated. It is then checked whether these time-of-flight values are sufficiently close to the original estimated time-of-flight value (based on the double-sided ranging), i.e., within a predetermined range around the original estimated time-of-flight value. A typical value for maximum tolerance may be 100 ps (corresponding to ~3 cm distance).

According to a further embodiment, the consistency check comprises a third consistency check, said third consistency check comprising: determining a carrier frequency offset value for each message in the sequence of messages; and checking that the carrier frequency offset values match each other and a control value within a predetermined tolerance range, wherein the control value is based on the relative frequency factor and the carrier frequency.

This third consistency check utilizes the fact that the UWB ranging devices generate their carrier frequencies based on their respective crystal frequencies, such that any mismatch between the crystal frequencies will also be observable in the carrier frequencies. More specifically, the carrier frequency offset value should be the same for all messages transmitted from the UWB ranging device to the further UWB ranging device. Furthermore, the carrier frequency offset value for a message transmitted in the opposite direction, i.e., from the further UWB ranging device to the UWB ranging device, should have the opposite sign but the same numerical value as the frequency offset value of messages transmitted from the UWB ranging device to the further UWB ranging device. Finally, the relative frequency factor allows calculation of a control value (by applying it to the nominal carrier frequency) which should be numerically equal to the carrier frequency offset values.

According to a further embodiment, the double-sided ranging process comprises two cycles, each cycle comprising exchanging the sequence of messages between the UWB ranging device and the further UWB ranging device and estimating a respective time-of-flight value and relative frequency factor, wherein the consistency check comprises a fourth consistency check, said fourth consistency check comprising: determining a first time distance between corresponding transmission or reception of a selected message at the UWB ranging device in each of the two cycles; determining a second time distance between corresponding reception or transmission of the selected message at the further UWB ranging device in each of the two cycles; calculating a long-term frequency ratio based on the first time distance, the second time distance, and the corresponding time-of-flight values; and checking that each of the relative frequency factors match the calculated long-term frequency ratio within a predetermined tolerance range.

In other words, this fourth consistency check verifies that the respective relative frequency factors match a long-term frequency ratio obtained on basis of the time distances between the two cycles and the respective time-of-flight values.

According to a further embodiment, the double-sided ranging process comprises two cycles, each cycle comprising exchanging the sequence of messages between the UWB ranging device and the further UWB ranging device, wherein the consistency check comprises a fifth consistency check, said fifth consistency check comprising: determining a first time distance between corresponding transmission or reception of a selected message at the UWB ranging device in each of the two cycles; determining a second time distance between corresponding reception or transmission of the selected message at the further UWB ranging device in each of the two cycles; estimating a further relative frequency factor based on the first time distance and the second time distance; calculating a time error based on the round times, the response times, and the further relative frequency factor; and checking that the time error is below a predetermined time error threshold value.

In other words, this fifth consistency check verifies that a time error calculated on the basis of a further relative frequency factor which is estimated based on the first and second time distances, i.e., without utilizing the round and response times in the current ranging cycle, is below a corresponding predetermined time error threshold value.

According to a further embodiment, the method further comprises: estimating a frequency difference between the UWB ranging device and the further UWB ranging device, wherein the consistency check is further based on the estimated frequency difference.

The frequency difference (i.e., the absolute difference between the crystals of the two ranging devices) is usually determined in ranging cycles as a precise estimate is needed in order to receive a frame from one device at the other device. Thus, the frequency difference is already available. The frequency difference can be used to verify the ranging result in a further number of ways.

According to a further embodiment, the consistency check comprises a sixth consistency check, said sixth consistency check comprising: estimating a first frequency value and a second frequency value based on the frequency difference and the relative frequency factor, wherein the first frequency value corresponds to the frequency of the UWB ranging device, and wherein the second frequency value corresponds to the frequency of the further UWB ranging device; checking, as a first check, that the estimated first frequency value is within a first predetermined range around a nominal frequency value; and checking, as a second check, that the estimated second frequency value is within a second predetermined range around the nominal frequency value, wherein the sixth consistency check is passed if both the first check and the second check are passed.

In other words, the frequencies of both UWB ranging devices are estimated on the basis of the frequency difference and the relative frequency factor, and it is checked that both estimated frequencies are within respective predetermined ranges around the nominal frequency value. The first and second predetermined range may be different or identical. In one embodiment, the first predetermined range may be ±10 ppm and the second predetermined range may be ±15 ppm.

According to a further embodiment, the first frequency value is estimated as $f_A = \Delta f \cdot f_r/(f_r-1)$ and the second frequency value is estimated as $f_B = \Delta f/(f_r-1)$. Here, $\Delta f$ denotes the estimated frequency difference and $f_r$ denotes the estimated relative frequency factor.

According to a further embodiment, the consistency check comprises a seventh consistency check, said seventh consistency check comprising: estimating a third frequency value and a fourth frequency value based on the estimated first frequency value, the estimated time-of-flight value, the nominal frequency value, the round times, and the response times, wherein the third frequency value corresponds to the frequency of the further UWB ranging device during a time period corresponding to the response time of the further UWB ranging device, and wherein the fourth frequency value corresponds to the frequency of the further UWB ranging device during a time period corresponding to the round time of the further UWB ranging device; calculating a difference between the third frequency value and the fourth frequency value; and checking that the calculated difference is within a predetermined range around zero.

In other words, the frequency of the further UWB ranging device is estimated during two different time periods during the double-sided ranging process, and it is checked that the difference between the two estimated frequency values is close to zero. If this is the case, it can be assumed that no manipulation of the frequency of the further UWB ranging device has taken place during the exchange of messages in the double-sided ranging process.

More specifically, the estimated third frequency value corresponds to the frequency of the further UWB ranging device during its response time, i.e., in the period of time that begins with receiving a polling message from the UWB ranging device and ends with sending a response message to the UWB ranging device. The estimated fourth frequency value corresponds to the frequency of the further UWB ranging device during its round time, i.e., in the period of time that begins with sending the response message to the UWB ranging device and ends with receiving a final message from the UWB ranging device.

According to a further embodiment, the consistency check comprises an eighth consistency check, said eighth consistency check comprising: estimating a fifth frequency value and a sixth frequency value based on the estimated second frequency value, the estimated time-of-flight value, the nominal frequency value, the round times, and the response times, wherein the fifth frequency value corresponds to the frequency of the UWB ranging device during a time period corresponding to the round time of the UWB ranging device, and wherein the sixth frequency value corresponds to the frequency of the UWB ranging device during a time period corresponding to the response time of the UWB ranging device; calculating a difference between the fifth frequency value and the sixth frequency value; and checking that the calculated difference is within a predetermined range around zero.

In other words, the frequency of the UWB ranging device is estimated during two different time periods during the double-sided ranging process, and it is checked that the difference between the two estimated frequency values is close to zero. If this is the case, it can be assumed that no manipulation of the frequency of the UWB ranging device has taken place during the exchange of messages in the double-sided ranging process.

More specifically, the estimated fifth frequency value corresponds to the frequency of the further UWB ranging device during its round time, i.e., in the period of time that begins with transmitting a polling message to the further UWB ranging device and ends with receiving a response message from the further UWB ranging device. The estimated sixth frequency value corresponds to the frequency of the UWB ranging device during its response time, i.e., in the period of time that begins with receiving the response message from the further UWB ranging device and ends with transmitting a final message to the further UWB ranging device.

According to a further embodiment, the consistency check comprises a ninth consistency check, said ninth consistency check comprising: calculating a further estimate of the frequency difference between the UWB ranging device and the further UWB ranging device based on the estimated relative frequency factor and the nominal frequency; and checking that the further estimate of the frequency difference is within a predetermined range around the estimated frequency difference.

In other words, it is checked whether two different estimates of the frequency difference (i.e., the estimated frequency difference and the further estimate of the frequency difference) are sufficiently close to each other. The further estimate of the frequency difference may be calculated as $\Delta f \approx (f_r - 1) * f_n$, where $f_n$ denotes the nominal frequency. In one embodiment, the nominal crystal frequency may be 38.4 MHz, and the allowed frequency difference may be 50 ppm.

According to a further embodiment, the consistency check comprises a plurality of consistency checks, and wherein verifying the ranging result requires that each of said plurality of consistency checks passes.

In particular, verifying the ranging result may require that several or all of the above-mentioned first to ninth consistency checks are passed.

According to a second aspect, there is provided a UWB ranging device configured to perform the steps of the method according to the first aspect or any of the above embodiments thereof.

This aspect is essentially based on the same idea as the first aspect discussed above and provides a UWB ranging device that is configured to perform the various methods discussed above in conjunction with the first aspect.

According to a third aspect, there is provided a UWB ranging system, comprising: a UWB ranging device; and a further UWB ranging device (B), wherein the UWB ranging device and the further UWB ranging device are configured to exchange a sequence of messages as part of a double-sided ranging process to obtain round times and response times at both the UWB ranging device and the further UWB ranging device, and wherein at least one of the UWB ranging device and the further UWB ranging device is further configured to: estimate a time-of-flight value based on the round times and response times, and verify the ranging result by performing a consistency check based on the estimated time-of-flight value and one or more predetermined parameter values.

This aspect is essentially based on the same idea as the first aspect discussed above and provides a UWB ranging system capable of performing the various methods discussed above in conjunction with the first aspect.

According to a further embodiment, the consistency check comprises checking that the estimated time-of-flight value is between zero and a predetermined maximum time-of-flight value.

In other words, the first consistency check serves to verify that the estimated time-of-flight makes physical sense by, on the one hand, not being negative and, on the other hand, not exceeding a predetermined maximum value. This check is very simple to carry out and can efficiently detect severe manipulations of the device frequency. A typical value for the predetermined maximum time-of-flight value may be 100 ns (corresponding to ~30 m distance).

According to a further embodiment, at least one of the UWB ranging device and the further UWB ranging device is further configured to estimate a relative frequency factor based on the round times and response times, the relative frequency factor being indicative of a ratio between the frequencies of the UWB ranging device and the further UWB ranging device, and wherein the consistency check is further based on the estimated relative frequency factor.

The relative frequency factor provides valuable information on the ratio between the actual frequencies of the UWB ranging devices, which can be used to verify the ranging result in numerous ways.

Assuming that there is no frequency manipulation in either of the ranging devices, the relative frequency factor $f_r$ can easily be calculated from the round times and response times: $f_r = (T_{rnd1} + T_{rsp2})/(T_{rsp1} + T_{rnd2})$, where $T_{rnd1}$ is the round time at the UWB ranging device, $T_{rsp2}$ is the response time at the UWB ranging device, $T_{rsp1}$ is the response time at the further UWB ranging device, and $T_{rnd2}$ is the round time at the further UWB ranging device.

According to a further embodiment, at least one of the UWB ranging device and the further UWB ranging device is further configured to estimate a frequency difference between the UWB ranging device and the further UWB ranging device, and wherein the consistency check is further based on the estimated frequency difference.

The frequency difference (i.e., the absolute difference between the crystals of the two ranging devices) is usually determined in ranging cycles as a precise estimate is needed in order to receive a frame from one device at the other device. Thus, the frequency difference is already available. The frequency difference can be used to verify the ranging result in a further number of ways.

According to a further embodiment, the consistency check comprises: estimating a first frequency value and a second frequency value based on the frequency difference and the relative frequency factor, wherein the first frequency value corresponds to the frequency of the UWB ranging device, and wherein the second frequency value corresponds to the frequency of the further UWB ranging device; checking, as a first check, that the estimated first frequency value is within a first predetermined range around a nominal frequency value; and checking, as a second check, that the estimated second frequency value is within a second predetermined range around the nominal frequency value.

In other words, the frequencies of both UWB ranging devices are estimated on the basis of the frequency difference and the relative frequency factor, and it is checked that both estimated frequencies are within respective predetermined ranges around the nominal frequency value. The first and second predetermined range may be different or identical. In one embodiment, the first predetermined range may be ±10 ppm and the second predetermined range may be ±15 ppm.

According to a further embodiment, the first frequency value is estimated as $f_A = \Delta f \cdot f_r / (f_r - 1)$ and the second frequency value is estimated as $f_B = \Delta f / (f_r - 1)$. Here, $\Delta f$ denotes the estimated frequency difference and $f_r$ denotes the estimated relative frequency factor.

According to a further embodiment, the consistency check further comprises: estimating a third frequency value and a fourth frequency value based on the estimated first frequency value, the estimated time-of-flight value, the nominal frequency value, the round times, and the response times, wherein the third frequency value corresponds to the frequency of the further UWB ranging device during a time period corresponding to the response time of the further UWB ranging device, and wherein the fourth frequency value corresponds to the frequency of the further UWB ranging device during a time period corresponding to the round time of the further UWB ranging device; calculating a difference between the third frequency value and the fourth frequency value; and checking that the calculated difference is within a predetermined range around zero.

In other words, the frequency of the further UWB ranging device is estimated during two different time periods during the double-sided ranging process, and it is checked that the difference between the two estimated frequency values is close to zero. If this is the case, it can be assumed that no manipulation of the frequency of the further UWB ranging device has taken place during the exchange of messages in the double-sided ranging process.

More specifically, the estimated third frequency value corresponds to the frequency of the further UWB ranging device during its response time, i.e., in the period of time that begins with receiving a polling message from the UWB ranging device and ends with sending a response message to the UWB ranging device. The estimated fourth frequency value corresponds to the frequency of the further UWB ranging device during its round time, i.e., in the period of time that begins with sending the response message to the UWB ranging device and ends with receiving a final message from the UWB ranging device.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
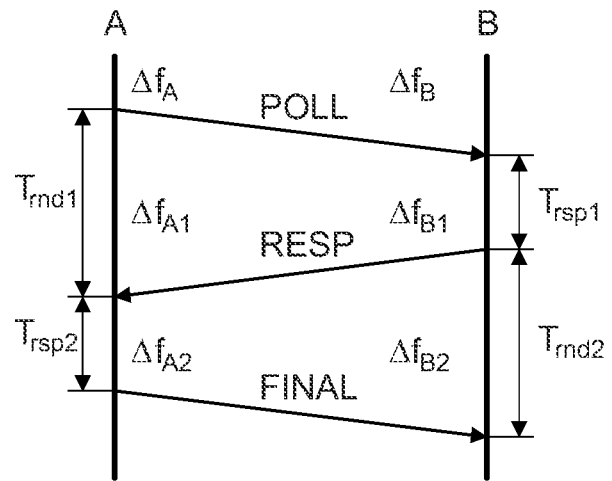
FIG. 1 shows an exemplary message exchange between two UWB ranging devices during a double-sided ranging process.

The illustration in the drawing is schematic. It is noted that in different figures, similar or identical elements are provided with the same reference signs or with reference signs, which differ only within the first digit.

FIG. 1 shows an exemplary message exchange between two UWB ranging devices A and B during a double-sided ranging process as known in the art. The UWB ranging device A may be a mobile device (either a dedicated ranging device or a more complex electronic device with ranging functionality, such as a smartphone) while the further UWB ranging device B may be a stationary device, also referred to as an anchor, within an UWB ranging network. The ranging device A initiates the ranging process (and may therefore also be referred to as the initiator) by transmitting a POLL message to the further ranging device B (which may also be referred to as the responder). At this stage, the offset of the internal clock frequency $f_A$ of the ranging device A (relative to a given nominal frequency $f_n$) is $\Delta f_A$, while the corresponding offset of the internal clock frequency $f_B$ of the further ranging device is $\Delta f_B$. The POLL message is received at the further ranging device B (the actual duration of the transmission is the sought "time of flight", often abbreviated tof or ToF. In response, the further ranging device B transmits a RESP message which is then received at the ranging device A. The time between receiving the POLL message at the further ranging device B and transmitting the RESP message is denoted the response time of the further ranging device B, $T_{rsp1}$, while the time between transmitting the POLL message from the ranging device A and receiving the RESP message at the ranging device A is denoted the round time of the ranging device A, $T_{rnd1}$. In response to receiving the RESP message, the ranging device A transmits a FINAL message to the further ranging device B. The time between receiving the RESP message at the ranging device A and transmitting the FINAL message is denoted the response time of the ranging device A, $T_{rsp2}$, while the time between transmitting the RESP message from the further ranging device B and receiving the FINAL message at the further ranging device B is denoted the round time of the further ranging device B, $T_{rnd2}$. The round times and response times are measured by the respective ranging devices A, B and exchanged between the ranging devices A and B, such that each of the ranging device A and B can estimate a corresponding time-of-flight value tof, e.g., utilizing the following known formula:

$$tof = \frac{T_{rnd1} T_{rnd2} - T_{rsp1} T_{rsp2}}{T_{rnd1} + T_{rnd2} + T_{rsp1} + T_{rsp2}}$$

However, if the frequency of one or both of the ranging devices A and B is manipulated during the exchange of messages described above, i.e., if the frequency offset $\Delta f_{A1}$ during the round time $T_{rnd1}$ and/or the frequency offset $\Delta f_{A2}$ during the response time $T_{rsp2}$ differs from the initial frequency offset $\Delta f_A$ at the initiator side A, and/or if the frequency offset $\Delta f_{B1}$ during the response time $T_{rsp1}$ and/or the frequency offset $\Delta f_{B2}$ during the round time $T_{rnd2}$ differs from the initial frequency offset $\Delta f_B$ at the responder side B, then the round times and/or response times will be inconsistent as they will be measured with a varying clock frequency. This will lead to corresponding errors in the estimated tof values, which will result in corresponding errors in the estimated ranging distance (calculated as d=tof·c, where c is the speed of light). The resulting distance error may be large enough (up to several hundred meters) to make the ranging result unusable and insecure in many applications, such as ranging based car opening systems, etc.

Figure 2:
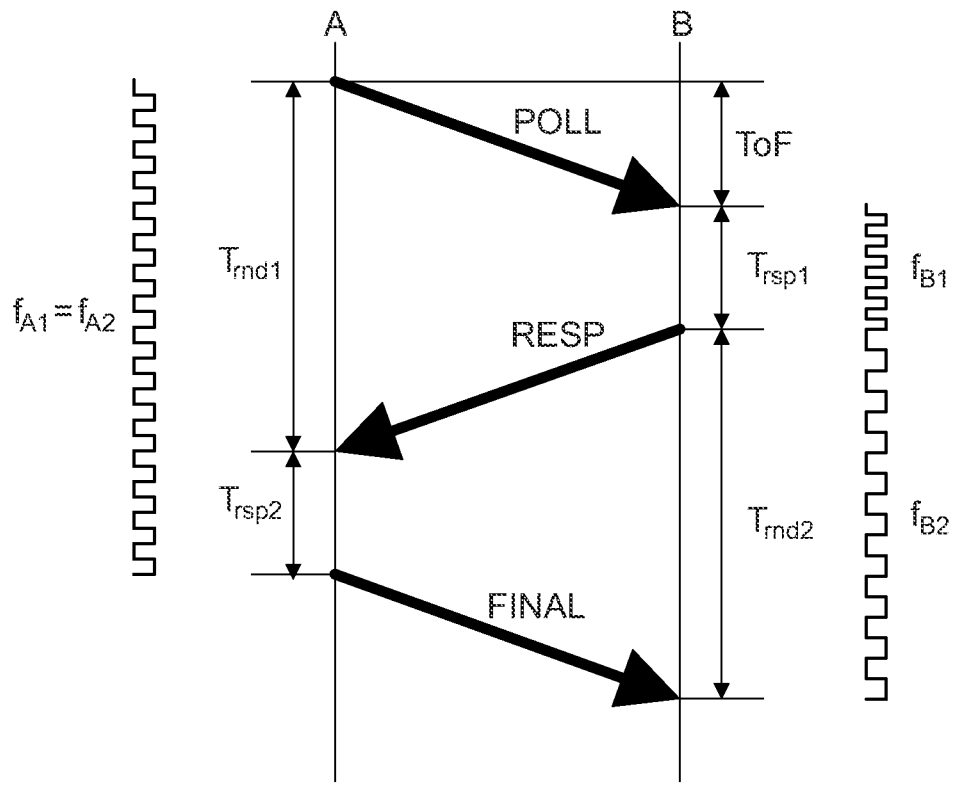
FIG. 2 illustrates one example of frequency manipulation during a double-sided ranging process.

FIG. 2 illustrates one example of frequency manipulation during a double-sided ranging process. As can be seen, the frequency at the initiator side A is constant ($f_{A1}=f_{A2}$) throughout the ranging cycle, whereas the frequency at the responder side B is higher during the response time $T_{rsp1}$ than during the round time $T_{rnd2}$ ($f_{B1}>f_{B2}$). Hence, the measured response time $T_{rsp1}$ and round time $T_{rnd2}$ at the responder side B are measured with different clocks and thus inconsistent.

In the following, the present disclosure presents a number of ranging consistency checks that can be used—alone or together—to verify the ranging result and detect a wide range of frequency manipulation schemes that may violate the security requirements of UWB ranging system applications.

A first consistency check comprises checking that the estimated time-of-flight value tof is between zero and a predetermined maximum time-of-flight value. By checking that the estimated tof is not negative, attacks that result in a significantly reduced tof estimate can be detected. Furthermore, by checking that the estimated tof does not exceed a predetermined maximum value, attacks that result in a significantly increased tof estimate, e.g., beyond a value corresponding to a distance that exceeds the physically possible communication range of the ranging device, such as 200 m, can be detected. Thus, this first consistency check can exclude extreme ranging results caused by frequency manipulation in a very simple manner. The first consistency check only needs the tof estimate and a predetermined maximum time-of-flight-value as a predetermined parameter value.

To perform further consistency checks, a relative frequency factor $f_r$ is estimated on the basis of the round times $T_{rnd1}$, $T_{rnd2}$ and the response times $T_{rsp1}$, $T_{rsp2}$. The relative frequency factor $f_r$ is indicative of a ratio between the frequency $f_A$ of the ranging device A and the frequency $f_B$ of the further ranging device B and can be calculated as $$f_r = \frac{f_A}{f_B} = \frac{T_{rnd1} + T_{rsp2}}{T_{rsp1} + T_{rnd2}}.$$

This formula can be derived based on the assumption that no frequency manipulation has taken place (i.e., $f_A=f_{A1}=f_{A2}$ and $f_B=f_{B1}=f_{B2}$) and the following observations:

The time between the first frame POLL and the second frame FINAL transmitted by the initiator A must be equal to the time between the first frame POLL and the second frame FINAL received by the responder B, and this time is independent of the actual time-of-flight. Furthermore, the times measured by the initiator and the responder depends on the respective frequency offsets (relative to the nominal frequency $f_n$). More specifically:

The actual responder response time $t_{rsp1}$ depends on the intended response time $T_{rsp1}$ and the responder frequency $f_{B1}$:

$$t_{rsp1} = T_{rsp1} \frac{f_n}{f_{B1}}.$$

The actual initiator response time $t_{rsp2}$ depends on the intended response time $T_{rsp2}$ and the initiator frequency $f_{A2}$:

$$t_{rsp2} = T_{rps2} \frac{f_n}{f_{A2}}.$$

The measured initiator round time $T_{rnd1}$ depends on the actual round time $t_{rnd1}$ and the initiator frequency $$f_{A1}: T_{rnd1} = t_{rnd1} \frac{f_{A1}}{f_n}.$$

The measured responder round time $T_{rnd2}$ depends on the actual round time $t_{rnd2}$ and the responder frequency $$f_{B2}: T_{rnd2} = t_{rnd2} \frac{f_{B2}}{f_n}.$$

Remembering that $t_{rsp1}+t_{rnd2}=t_{rnd1}+t_{rsp2}$ then yields the equation $$\frac{T_{rsp1}}{f_{B1}} + \frac{T_{rnd2}}{f_{B2}} = \frac{T_{rnd1}}{f_{A1}} + \frac{T_{rsp2}}{f_{A2}}$$

which in case of no frequency manipulation reduces to $$\frac{T_{rsp1} + T_{rnd2}}{f_B} = \frac{T_{rnd1} + T_{rsp2}}{f_A}$$

This last equation can then be rearranged to yield the above formula for estimating the relative frequency factor $f_r$.

The estimated relative frequency factor $f_r$ can be used in a second consistency check to extract two single-sided ranging cycles from a double-sided ranging cycle (cf. FIG. 1) and to calculate a first single-sided tof estimate $tof_{SS1}$ and a second single-sided tof estimate $tof_{SS2}$ based on the respective round times and the respective response times as follows:

$$tof_{SS1} = (T_{rnd1} - T_{rsp1} \cdot f_r)/2$$

$$tof_{SS2} = (T_{rnd2} \cdot f_r - T_{rsp2})/2$$

By checking that both the calculated first single-sided time-of-flight value $tof_{SS1}$ and the calculated second single-sided time-of-flight value $tof_{SS2}$ are within a predetermined range around the estimated time-of-flight value tof (double-sided), in particular attacks involving frequency manipulation for only one of the measured periods (such as the situation shown in FIG. 2 where $f_{B1} > f_{B2}$) can be effectively detected. Unfortunately, the frequencies $f_{B1}$ and $f_{B2}$ can be adjusted in such a way, that all 3 tof values get smaller, all stay consistent, and the attack cannot be detected. Hence, not all frequency manipulations can be detected this way, but this second consistency check makes it extra difficult for an attacker, who must control the frequency offset very precisely.

The estimated relative frequency factor $f_r$ can further be used in a third consistency check which comprises determining a carrier frequency offset value for each message in the sequence of messages and checking that the carrier frequency offset values match each other and a control value within a predetermined tolerance range, wherein the control value is based on the relative frequency factor $f_r$ and the carrier frequency $f_c$.

More specifically, for non-manipulated systems, the carrier frequency offset measured for the POLL frame, $cfo_{POLL}$ must equal the offset measured for the FINAL frame, $cfo_{FINAL}$, and it must equal the inverted value of the offset measured for the RESP frame, $cfo_{RESP}$. Furthermore, it must match the measured frequency ratio $f_r$:

$cfo_{POLL} = cfo_{FINAL} = -cfo_{RESP} = (f_r - 1) \cdot f_C$, where $f_C$ is the carrier frequency.

Figure 3:
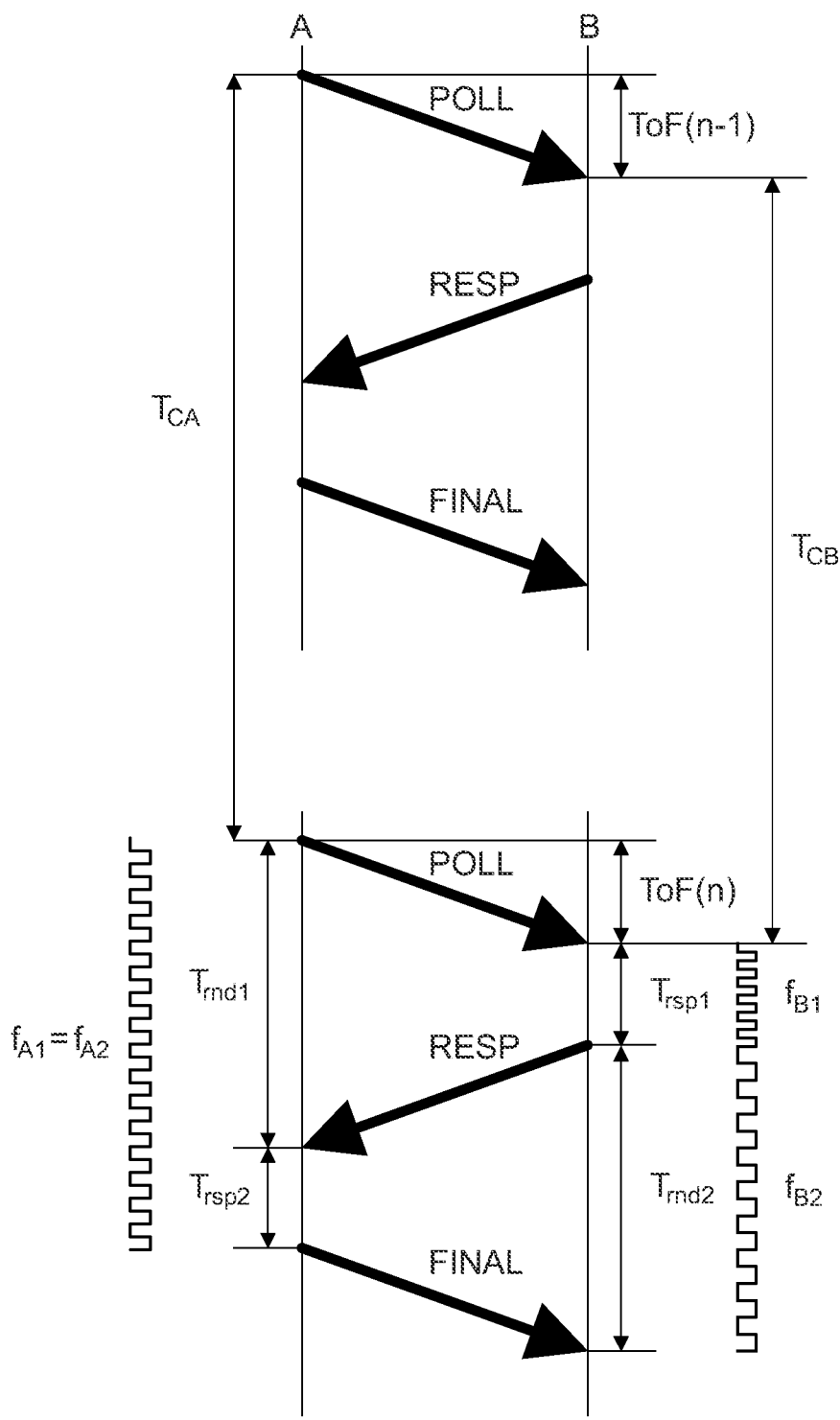
FIG. 3 illustrates an exemplary principle of detecting the frequency manipulation shown in FIG. 2.

The estimated relative frequency factor $f_r$ can further be used in a fourth consistency check. This fourth consistency check aims at detecting the kind of frequency manipulation that is shown in FIG. 2, and the principle of this check is shown in FIG. 3. First of all, the double-sided ranging process comprises (at least) two cycles as shown in FIG. 3, each cycle comprising exchanging the sequence of messages between the UWB ranging device A and the further UWB ranging device B and estimating a respective time-of-flight value ($tof_{(n-1)}$, $tof_{(n)}$) and relative frequency factor ($f_{r(n-1)}$, $f_{r(n)}$) in the manner discussed above. The fourth consistency check then comprises: determining a first time distance $T_{CA}$ between corresponding transmission or reception of a selected message (such as POLL) at the UWB ranging device A in each of the two cycles, determining a second time distance $T_{CB}$ between corresponding reception or transmission of the selected message (such as POLL) at the further UWB ranging device B in each of the two cycles, calculating a long-term frequency ratio $f_{rLT}$ based on the first time distance $T_{CA}$, the second time distance $T_{CB}$, and the corresponding time-of-flight values $tof_{(n-1)}$ and $tof_{(n)}$), and checking that each of the relative frequency factors $f_{r(n-1)}$ and $f_{r(n)}$ match the calculated long-term frequency ratio $f_{rLT}$ within a predetermined tolerance range. The long-term frequency ratio $f_{rLT}$ may in particular be calculated as:

$$f_{rLT} = T_{CA}/(T_{CB} + tof_{(n-1)} - tof_{(n)}).$$

Figure 4A:
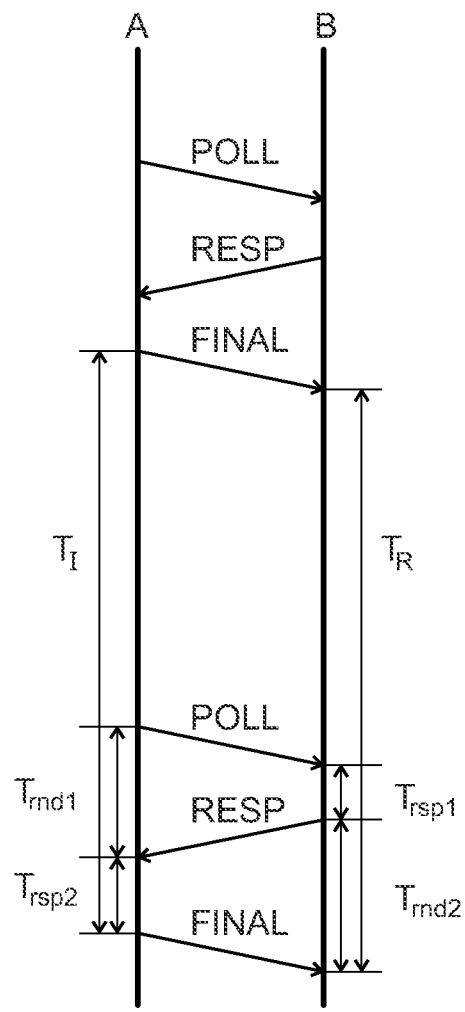
FIG. 4A and FIG. 4B show two further exemplary principles of detecting frequency manipulation.
Figure 4B:
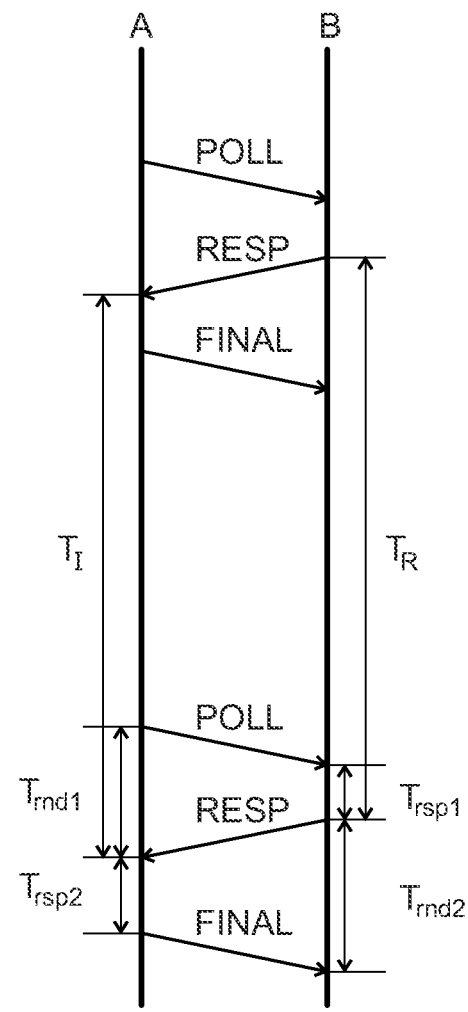

The estimated relative frequency factor $f_r$ can further be used in a fifth consistency check. FIG. 4A and FIG. 4B show two exemplary principles of detecting frequency manipulation utilizing the fifth consistency check. Like in the fourth consistency check described above, the double-sided ranging process comprises (at least) two cycles as shown in FIG. 4A and FIG. 4B, each cycle comprising exchanging the sequence of messages between the UWB ranging device A and the further UWB ranging device B. The fifth consistency check then comprises: determining a first time distance $T_I$ between corresponding transmission or reception of a selected message at the UWB ranging device A in each of the two cycles (such as between transmission of the FINAL message in each of the two cycles as shown in FIG. 4A, or such as between receipt of the RESP message in each of the two cycles as shown in FIG. 4B), determining a second time distance $T_R$ between corresponding reception or transmission of the selected message at the further UWB ranging device B in each of the two cycles (such as between receipt of the FINAL message in each of the two cycles as shown in FIG. 4A, or such as between transmission of the RESP message in each of the two cycles as shown in FIG. 4B), estimating a further relative frequency factor $f'_r$ based on the first time distance $T_I$ and the second time distance $T_R$ (e.g., as the ratio $T_I/T_R$), calculating a time error $T_E$ based on the round times $T_{rnd1}$, $T_{rnd2}$, the response times $T_{rsp1}$, $T_{rsp2}$, and the further relative frequency factor $f'_r$, and checking that the calculated time error $T_e$ is below a predetermined time error threshold value $T_{e\_thr}$. The time error $T_e$ may in particular be calculated as $$T_e = (T_{rsp2} + T_{rnd1}) - (T_{rsp1} + T_{rnd2}) \cdot f'_r.$$

To perform even more consistency checks, an estimated frequency difference $\Delta f$ between the UWB ranging device and the further UWB ranging device may be utilized. The frequency difference between initiator A and responder B is normally estimated during reception of a frame, and a precise estimate is needed in order to receive the frame. Typically, the accuracy is better than 1 ppm. The initiator frequency $f_A$ has an offset $\Delta f_A$ from the nominal frequency $f_n$: $f_A = f_n + \Delta f_A$. Similarly, the responder frequency $f_B$ has an offset $\Delta f_B$ from the nominal frequency $f_n$: $f_B = f_n + \Delta f_B$. The frequency difference $\Delta f$ is the difference of the initiator frequency $f_A$ and responder frequency $f_B$:

$$\Delta f = f_A - f_B = \Delta f_A - \Delta f_B$$

The estimated frequency difference $\Delta f$ may be used in a sixth consistency check, comprising: estimating a first frequency value $f_A$ and a second frequency value $f_B$ based on the frequency difference $\Delta f$ and the relative frequency factor $f_r$, wherein the first frequency value corresponds to the frequency of the UWB ranging device A, and wherein the second frequency value corresponds to the frequency of the further UWB ranging device B, checking, as a first check, that the estimated first frequency value $f_A$ is within a first predetermined range around a nominal frequency value $f_n$, and checking, as a second check, that the estimated second frequency value $f_B$ is within a second predetermined range around the nominal frequency value $f_n$. The sixth consistency check is passed if both the first check and the second check are passed. More specifically, the first frequency value is estimated as $f_A=\Delta f \cdot f_r/(f_r-1)$ and the second frequency value is estimated as $f_B=\Delta f/(f_r-1)$. In this exemplary embodiment, the first predetermined range may be ±10 ppm and the second predetermined range may be ±15 ppm. The calculations in this sixth consistency check rely on the assumption that there is no frequency manipulation at either side A or B. If the first and/or second checks are not passed, this is an indication that the assumption does not hold and that an attack has happened.

The estimated frequency difference Δf may further be used in a seventh consistency check, comprising: estimating a third frequency value $f_{B1}$ and a fourth frequency value $f_{B2}$ based on the estimated first frequency value $f_A$, the estimated time-of-flight value tof, the nominal frequency value $f_n$, the round times $T_{rnd1}$, $T_{rnd2}$, and the response times $T_{rsp1}$, $T_{rsp2}$, wherein the third frequency value $f_{B1}$ corresponds to the frequency of the further UWB ranging device B during a time period corresponding to the response time $T_{rsp1}$ of the further UWB ranging device B, and wherein the fourth frequency value $f_{B2}$ corresponds to the frequency of the further UWB ranging device B during a time period corresponding to the round time $T_{rnd2}$ of the further UWB ranging device B, calculating a difference between the third frequency value and the fourth frequency value; and checking that the calculated difference is within a predetermined range around zero. The calculations in this seventh consistency check rely on the assumption that there is no frequency manipulation on the initiator side A. More specifically:

$$t_{rnd1} = t_{rsp1} + 2tof \rightarrow \frac{T_{rnd1}}{f_A} = \frac{T_{rsp1}}{f_{B1}} + \frac{2tof}{f_n} \rightarrow f_{B1} = \frac{T_{rsp1}f_A}{T_{rnd1} - 2tof\frac{f_A}{f_n}}$$

$$t_{rnd2} = t_{rsp2} + 2tof \rightarrow \frac{T_{rnd2}}{f_{B2}} = \frac{T_{rsp2}}{f_A} + \frac{2tof}{f_n} \rightarrow f_{B2} = \frac{T_{rnd2}f_A}{T_{rsp2} + 2tof\frac{f_A}{f_n}}$$

If the third and fourth frequency values $f_{B1}$ and $f_{B2}$ differ significantly from each other, an attack involving frequency manipulation has occurred.

The estimated frequency difference Δf may further be used in an eighth consistency check, comprising: estimating a fifth frequency value ($f_{A1}$ and a sixth frequency value $f_{A2}$ based on the estimated second frequency value $f_B$, the estimated time-of-flight value tof, the nominal frequency value $f_n$, the round times $T_{rnd1}$, $T_{rnd2}$, and the response times $T_{rsp1}$, $T_{rsp2}$, wherein the fifth frequency value $f_{A1}$ corresponds to the frequency of the UWB ranging device A during a time period corresponding to the round time $T_{rnd1}$ of the UWB ranging device A, and wherein the sixth frequency value $f_{A2}$ corresponds to the frequency of the UWB ranging device A during a time period corresponding to the response time $T_{rsp2}$ of the UWB ranging device A, calculating a difference between the fifth frequency value and the sixth frequency value, and checking that the calculated difference is within a predetermined range around zero. The calculations in this eighth consistency check rely on the assumption that there is no frequency manipulation on the responder side B. More specifically:

$$t_{rnd1} = t_{rsp1} + 2tof \rightarrow \frac{T_{rnd1}}{f_{A1}} = \frac{T_{rsp1}}{f_B} + \frac{2tof}{f_n} \rightarrow f_{A1} = \frac{T_{rnd1}f_B}{T_{rsp1} + 2tof\frac{f_B}{f_n}}$$

$$t_{rnd2} = t_{rsp2} + 2tof \rightarrow \frac{T_{rnd2}}{f_B} = \frac{T_{rsp2}}{f_{A2}} + \frac{2tof}{f_n} \rightarrow f_{A2} = \frac{T_{rsp2}f_B}{T_{rnd2} - 2tof\frac{f_B}{f_n}}$$

If the fifth and sixth frequency values $f_{A1}$ and $f_{A2}$ differ significantly from each other, an attack involving frequency manipulation has occurred.

The estimated frequency difference Δf may further be used in a ninth consistency check, comprising: calculating a further estimate of the frequency difference Δf' between the UWB ranging device A and the further UWB ranging device B based on the estimated relative frequency factor $f_r$ and the nominal frequency $f_n$, and checking that the further estimate of the frequency difference Δf' is within a predetermined range around the estimated frequency difference Δf. In this consistency check, the estimated frequency difference Δf is compared to a further estimate of the frequency difference Δf'. The latter may be estimated as follows:

$$f_r = \frac{f_A}{f_B} = \frac{f_n + \Delta f_A}{f_n + \Delta f_B} = \frac{f_n + \Delta f_B - \Delta f_B + \Delta f_A}{f_n + \Delta f_B} =$$
$$1 + \frac{\Delta f_A - \Delta f_B}{f_n + \Delta f_B} = 1 + \frac{\Delta f}{f_n + \Delta f_B} \approx 1 + \frac{\Delta f}{f_n} \rightarrow \Delta f' \approx (f_r - 1)f_n$$

Figure 5:
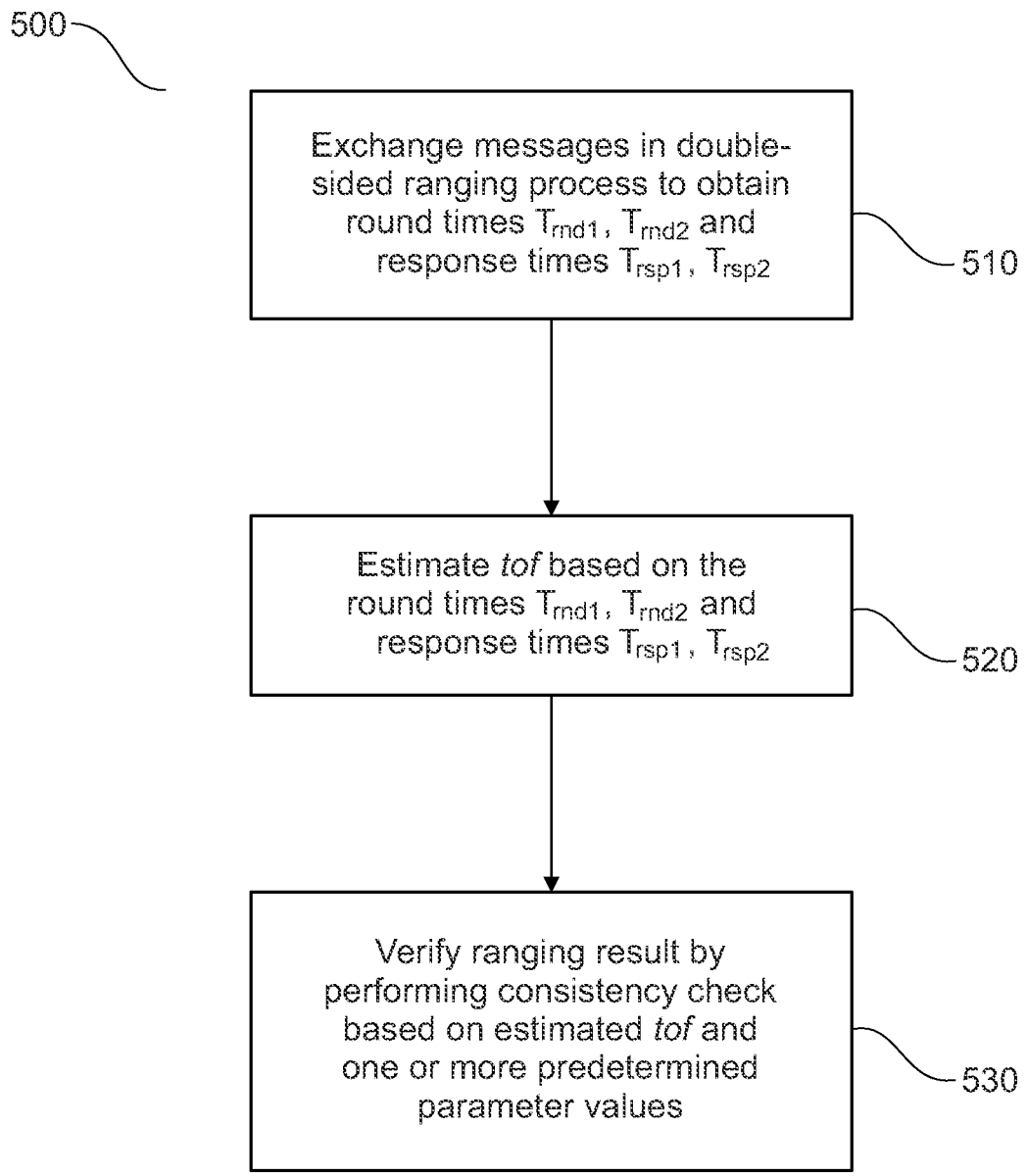
FIG. 5 shows a flow diagram of a method for verifying a ranging result in accordance with the present disclosure.

FIG. 5 shows a flow diagram of a method 500 for verifying a ranging result in accordance with the present disclosure.

The method 500 begins at 510 by exchanging a sequence of messages (POLL, RESP, FINAL as shown e.g., in FIG. 1) between a UWB ranging device, initiator A, and a further UWB ranging device, responder B, as part of a double-sided ranging process to obtain round times $T_{rnd1}$, $T_{rnd2}$ and response times $T_{rsp1}$, $T_{rsp2}$ at both the UWB ranging device A and the further UWB ranging device B.

Then, the method 500 continues at 520 by estimating a time-of-flight value tof based on the round times and response times.

The method then continues at 530 by verifying the ranging result by performing a consistency check based on the estimated time-of-flight value tof and one or more predetermined parameter values. The consistency check may in particular comprise one, more or all of the above-described first to ninth consistency check. The verification is successful if all applied consistency checks are passed. If the verification fails, an error message or warning may be output to a user and/or operator of the device and/or ranging system.

Figure 6:
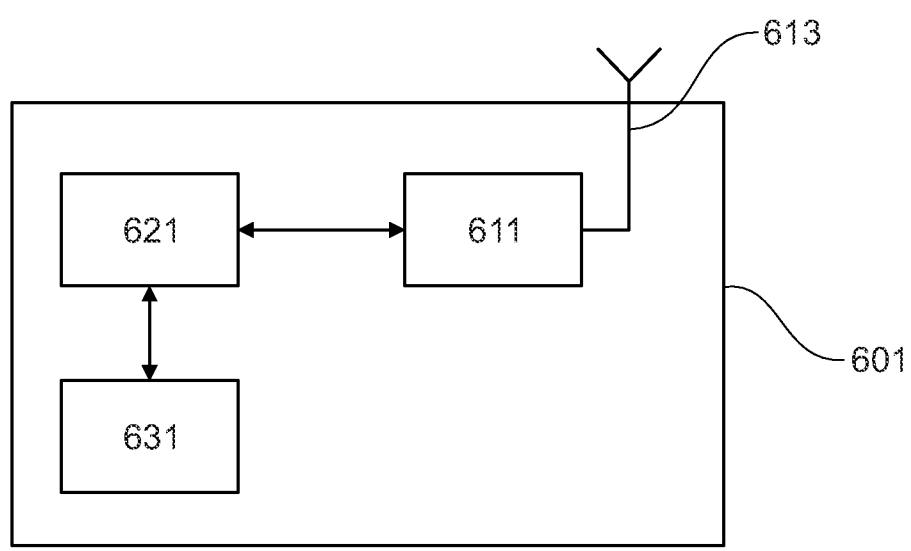
FIG. 6 shows a block diagram of a ranging device according to the present disclosure.

FIG. 6 shows a block diagram of a UWB ranging device 601 according to the present disclosure. The ranging device 601 comprises RF circuitry 611 connected to antenna 613 and to processing circuitry 621, which in turn is connected to memory circuitry 631. The processing circuitry 621 is configured to perform the method 500 discussed above utilizing program code and/or parameter values stored in the memory circuitry 631.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be com-

The invention claimed is:

1. A method of verifying a time-of-flight based ranging result in a UWB ranging device, the method comprising:
    exchanging a sequence of messages between the UWB ranging device and a further UWB ranging device as part of a double-sided ranging process to obtain round times and response times at both the UWB ranging device and the further UWB ranging device;
    estimating a time-of-flight value based on the round times and response times; and
    verifying the ranging result by performing a consistency check based on the estimated time-of-flight value (tof) and one or more predetermined parameter values.

2. The method according to claim 1, wherein the consistency check comprises a first consistency check, said first consistency check comprising:
    checking that the estimated time-of-flight value is between zero and a predetermined maximum time-of-flight value.

3. The method according to claim 1, further comprising:
    estimating a relative frequency factor based on the round times and response times, the relative frequency factor being indicative of a ratio between the frequencies of the UWB ranging device and the further UWB ranging device,
    wherein the consistency check is further based on the estimated relative frequency factor.

4. The method according to claim 3, wherein the consistency check comprises a second consistency check, said second consistency check comprising:
    calculating a first single-sided time-of-flight value based on the round time ($T_{rnd1}$) of the UWB ranging device, the response time of the further UWB ranging device, and the relative frequency factor;
    calculating a second single-sided time-of-flight value based on the round time of the further UWB ranging device, the response time of the UWB ranging device, and the relative frequency factor; and
    checking that both the calculated first single-sided time-of-flight value and the calculated second single-sided time-of-flight value are within a predetermined range around the estimated time-of-flight value.

5. The method according to claim 3, wherein the consistency check comprises a third consistency check, said third consistency check comprising:
    determining a carrier frequency offset value for each message in the sequence of messages; and
    checking that the carrier frequency offset values match each other and a control value within a predetermined tolerance range, wherein the control value is based on the relative frequency factor and the carrier frequency.

6. The method according to claim 3, wherein the double-sided ranging process comprises two cycles, each cycle comprising exchanging the sequence of messages between the UWB ranging device and the further UWB ranging device and estimating a respective time-of-flight value and relative frequency factor, wherein the consistency check comprises a fourth consistency check, said fourth consistency check comprising:
    determining a first time distance between corresponding transmission or reception of a selected message at the UWB ranging device in each of the two cycles;
    determining a second time distance between corresponding reception or transmission of the selected message at the further UWB ranging device in each of the two cycles;
    calculating a long-term frequency ratio based on the first time distance, the second time distance, and the corresponding time-of-flight values; and
    checking that each of the relative frequency factors match the calculated long-term frequency ratio within a predetermined tolerance range.

7. The method according to any one of claims 3, wherein the double-sided ranging process comprises two cycles, each cycle comprising exchanging the sequence of messages between the UWB ranging device and the further UWB ranging device, wherein the consistency check comprises a fifth consistency check, said fifth consistency check comprising:
    determining a first time distance between corresponding transmission or reception of a selected message at the UWB ranging device in each of the two cycles;
    determining a second time distance between corresponding reception or transmission of the selected message at the further UWB ranging device in each of the two cycles;
    estimating a further relative frequency factor based on the first time distance and the second time distance;
    calculating a time error based on the round times, the response times, and the further relative frequency factor; and
    checking that the time error is below a predetermined time error threshold value.

8. The method according to claim 3, further comprising:
    estimating a frequency difference between the UWB ranging device and the further UWB ranging device, wherein the consistency check is further based on the estimated frequency difference.

9. The method according to claim 8, wherein the consistency check comprises a sixth consistency check, said sixth consistency check comprising:
    estimating a first frequency value and a second frequency value based on the frequency difference and the relative frequency factor, wherein the first frequency value corresponds to the frequency of the UWB ranging device, and wherein the second frequency value corresponds to the frequency of the further UWB ranging device;
    checking, as a first check, that the estimated first frequency value is within a first predetermined range around a nominal frequency value; and
    checking, as a second check, that the estimated second frequency value is within a second predetermined range around the nominal frequency value,
    wherein the sixth consistency check is passed if both the first check and the second check are passed.

10. The method according to claim 9, wherein the consistency check comprises a seventh consistency check, said seventh consistency check comprising:
    estimating a third frequency value and a fourth frequency value based on the estimated first frequency value, the estimated time-of-flight value, the nominal frequency value, the round times, and the response times, wherein the third frequency value corresponds to the frequency of the further UWB ranging device during a time period corresponding to the response time of the further UWB ranging device, and wherein the fourth frequency value corresponds to the frequency of the further UWB ranging device during a time period corresponding to the round time of the further UWB ranging device;
calculating a difference between the third frequency value and the fourth frequency value; and
checking that the calculated difference is within a predetermined range around zero.

11. The method according to claim 9, wherein the consistency check comprises an eighth consistency check, said eighth consistency check comprising:
estimating a fifth frequency value and a sixth frequency value based on the estimated second frequency value, the estimated time-of-flight value, the nominal frequency value, the round times, and the response times, wherein the fifth frequency value corresponds to the frequency of the UWB ranging device during a time period corresponding to the round time of the UWB ranging device, and wherein the sixth frequency value corresponds to the frequency of the UWB ranging device during a time period corresponding to the response time of the UWB ranging device;
calculating a difference between the fifth frequency value and the sixth frequency value; and
checking that the calculated difference is within a predetermined range around zero.

12. The method according to claim 8, wherein the consistency check comprises a ninth consistency check, said ninth consistency check comprising:
calculating a further estimate of the frequency difference between the UWB ranging device and the further UWB ranging device based on the estimated relative frequency factor and the nominal frequency; and
checking that the further estimate of the frequency difference is within a predetermined range around the estimated frequency difference.

13. The method according to claim 1, wherein the consistency check comprises a plurality of consistency checks, and wherein verifying the ranging result requires that each of said plurality of consistency checks passes.

14. A UWB ranging device configured to perform the steps of the method according to claim 1.

15. A UWB ranging system, comprising:
a UWB ranging device; and
a further UWB ranging device,
wherein the UWB ranging device and the further UWB ranging device are configured to exchange a sequence of messages as part of a double-sided ranging process to obtain round times and response times at both the UWB ranging device and the further UWB ranging device, and
wherein at least one of the UWB ranging device and the further UWB ranging device is further configured to:
estimate a time-of-flight value based on the round times and response times, and
verify the ranging result by performing a consistency check based on the estimated time-of-flight value and one or more predetermined parameter values.

16. The method according to claim 2, further comprising:
estimating a relative frequency factor based on the round times and response times, the relative frequency factor being indicative of a ratio between the frequencies of the UWB ranging device and the further UWB ranging device,
wherein the consistency check is further based on the estimated relative frequency factor.

17. The method according to claim 4, wherein the consistency check comprises a third consistency check, said third consistency check comprising:
determining a carrier frequency offset value for each message in the sequence of messages; and
checking that the carrier frequency offset values match each other and a control value within a predetermined tolerance range, wherein the control value is based on the relative frequency factor and the carrier frequency.

18. The method according to claim 4, wherein the double-sided ranging process comprises two cycles, each cycle comprising exchanging the sequence of messages between the UWB ranging device and the further UWB ranging device and estimating a respective time-of-flight value and relative frequency factor, wherein the consistency check comprises a fourth consistency check, said fourth consistency check comprising:
determining a first time distance between corresponding transmission or reception of a selected message at the UWB ranging device in each of the two cycles;
determining a second time distance between corresponding reception or transmission of the selected message at the further UWB ranging device in each of the two cycles;
calculating a long-term frequency ratio based on the first time distance, the second time distance, and the corresponding time-of-flight values; and
checking that each of the relative frequency factors match the calculated long-term frequency ratio within a predetermined tolerance range.

19. The method according to any one of claims 4, wherein the double-sided ranging process comprises two cycles, each cycle comprising exchanging the sequence of messages between the UWB ranging device and the further UWB ranging device, wherein the consistency check comprises a fifth consistency check, said fifth consistency check comprising:
determining a first time distance between corresponding transmission or reception of a selected message at the UWB ranging device in each of the two cycles;
determining a second time distance between corresponding reception or transmission of the selected message at the further UWB ranging device in each of the two cycles;
estimating a further relative frequency factor based on the first time distance and the second time distance;
calculating a time error based on the round times, the response times, and the further relative frequency factor; and
checking that the time error is below a predetermined time error threshold value.

20. The method according to claim 4, further comprising:
estimating a frequency difference between the UWB ranging device and the further UWB ranging device, wherein the consistency check is further based on the estimated frequency difference.

* * * * *